No. 684,055.  
Patented Oct. 8, 1901.
H. W. GABBETT-FAIRFAX.
AUTOMATIC FIREARM.
(Application filed Oct. 15, 1900.)
(No Model.)  
8 Sheets—Sheet 1.
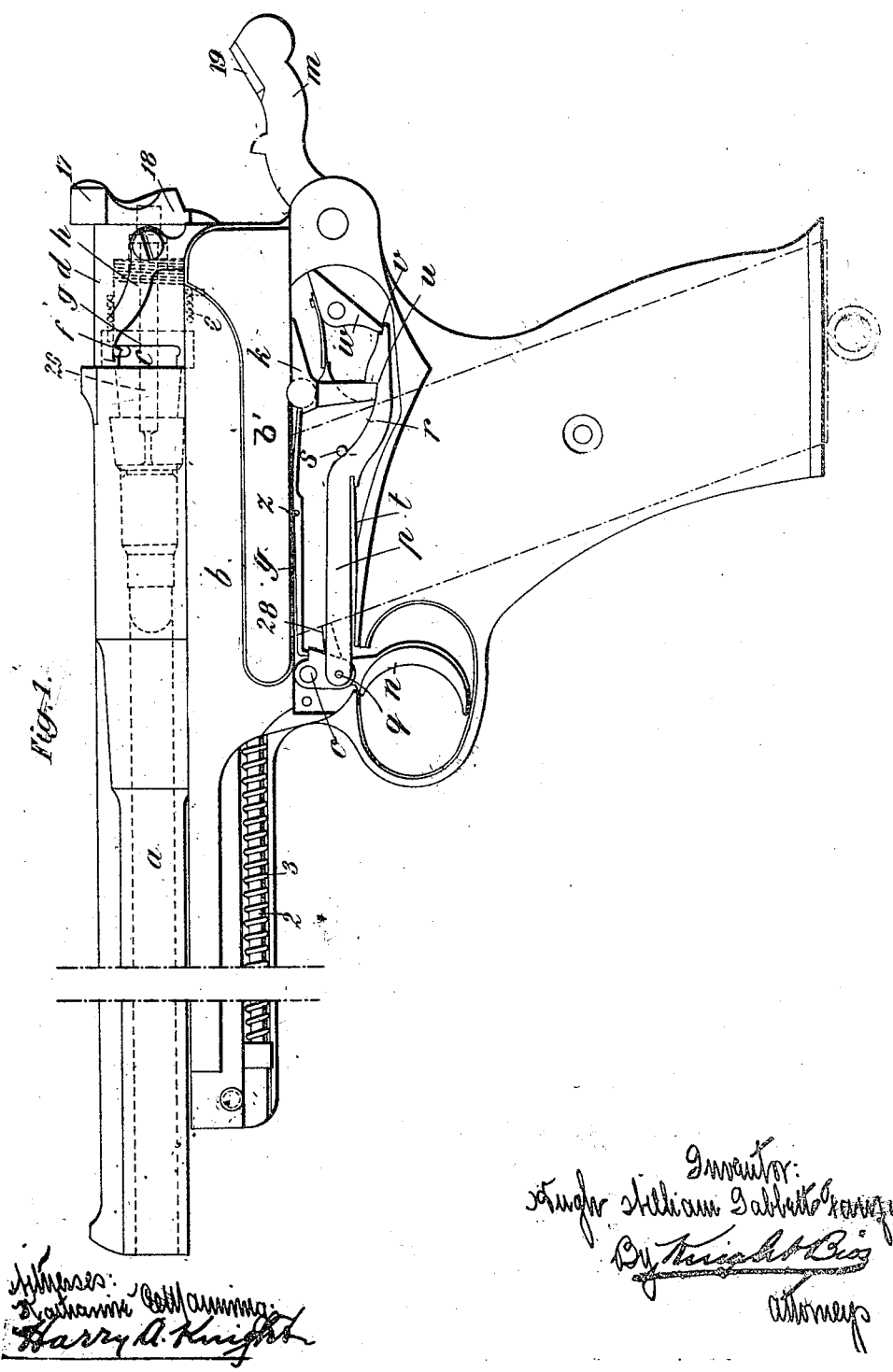

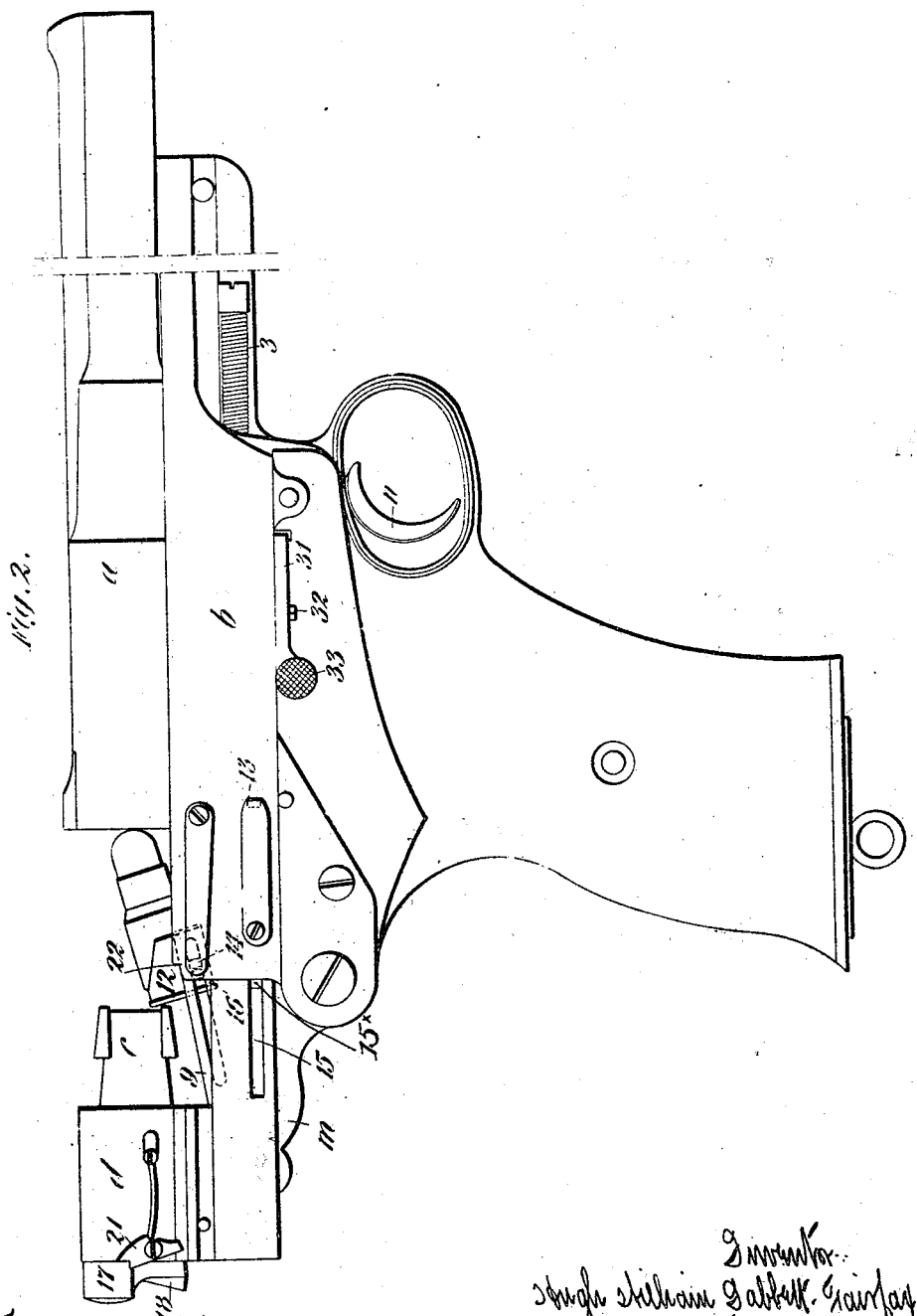

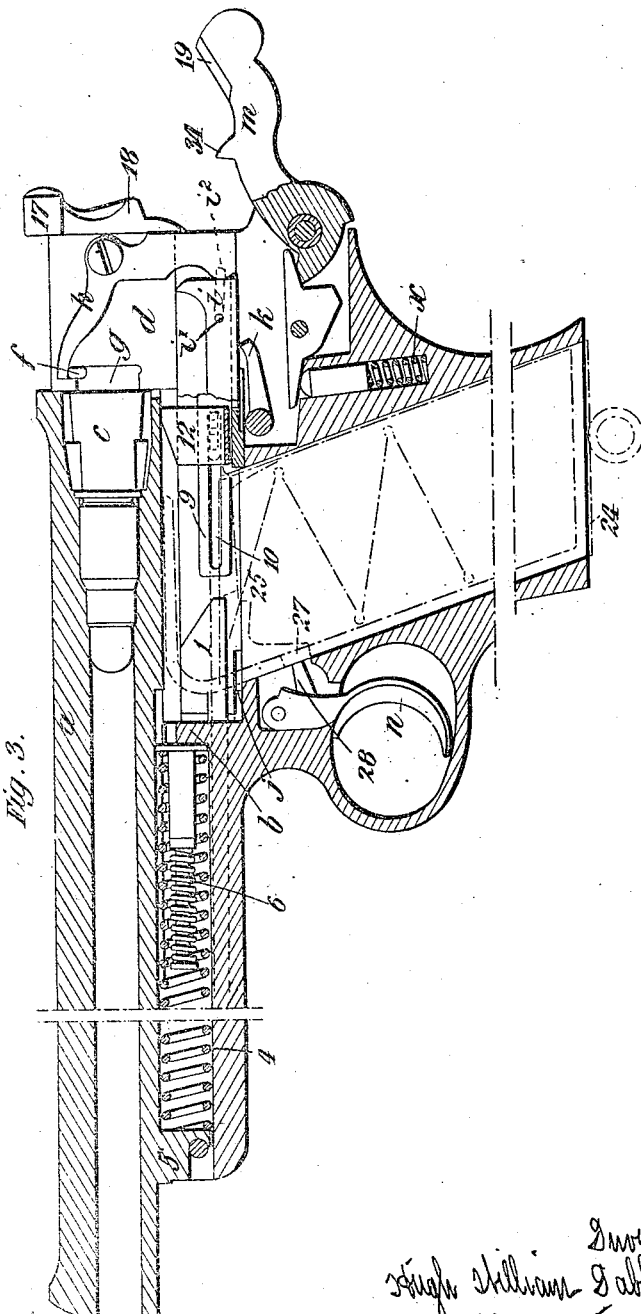

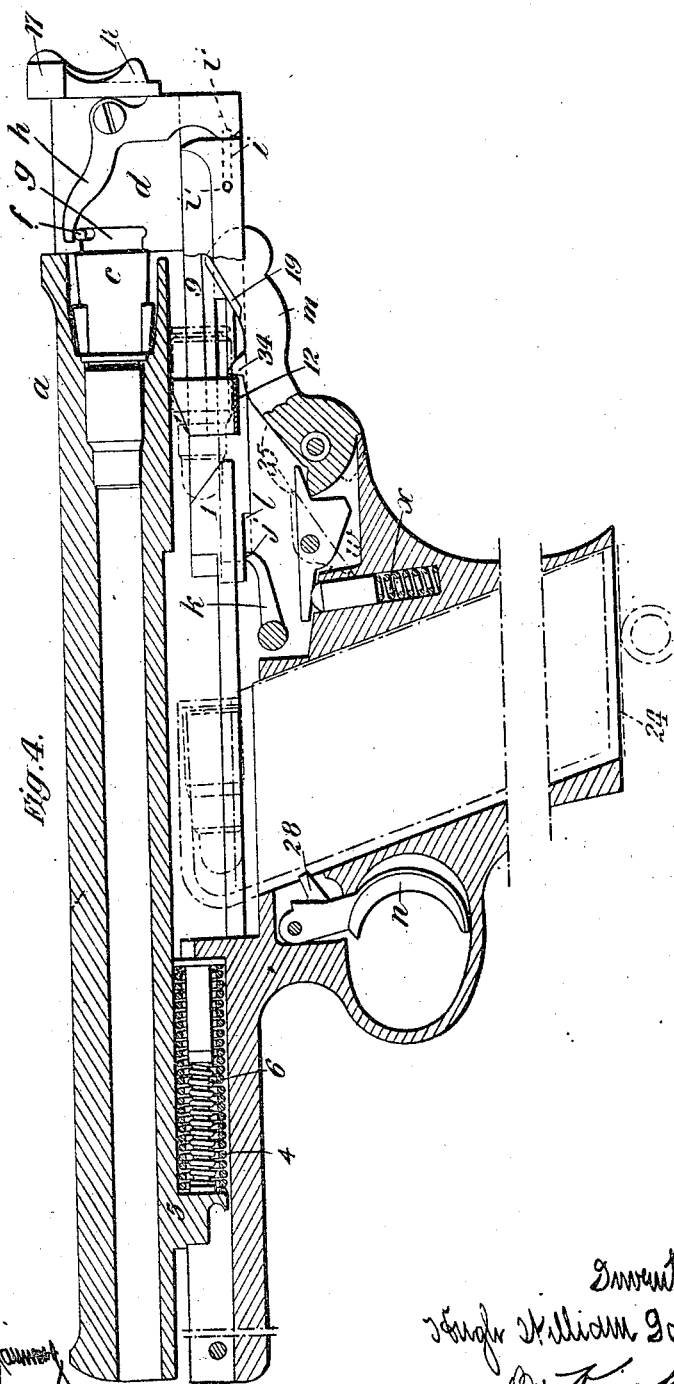

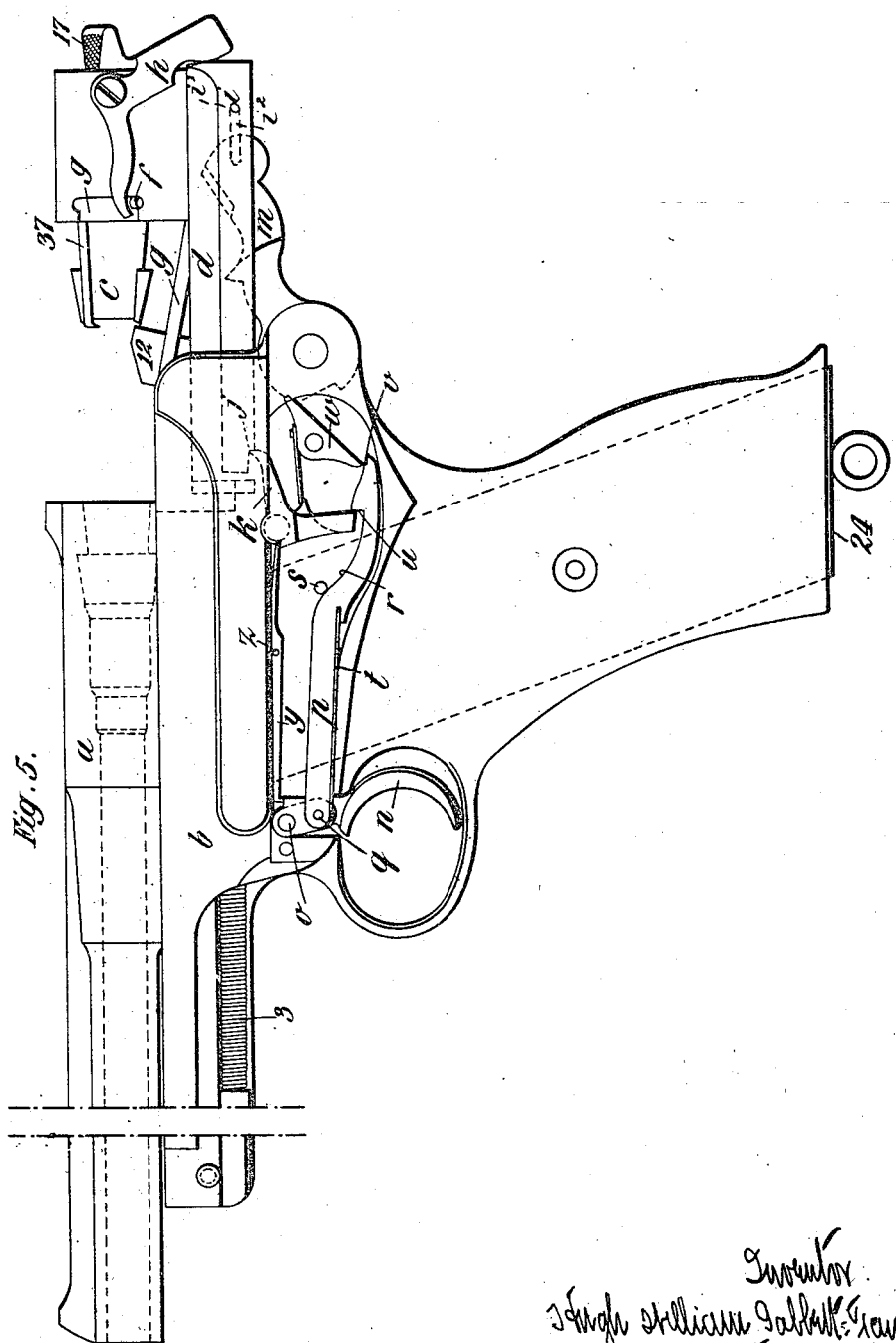

No. 684,055. Patented Oct. 8, 1901.
H. W. GABBETT-FAIRFAX.
AUTOMATIC FIREARM.
(Application filed Oct. 15, 1900.)
(No Model.) 8 Sheets—Sheet 6.
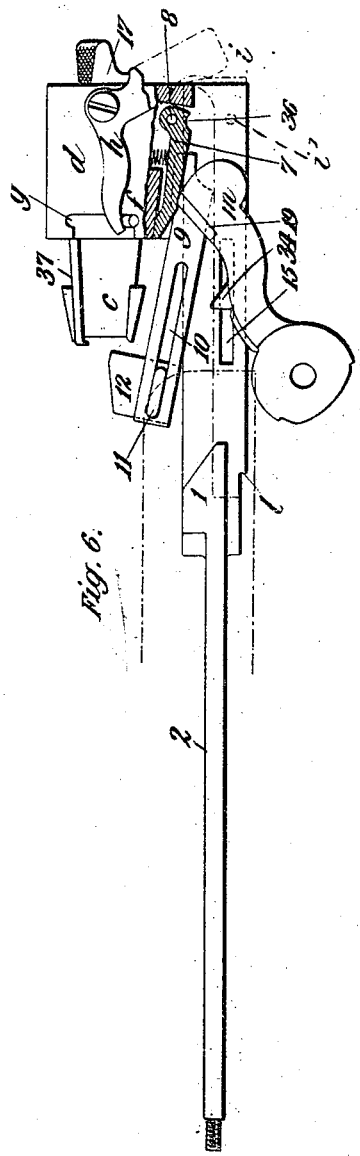
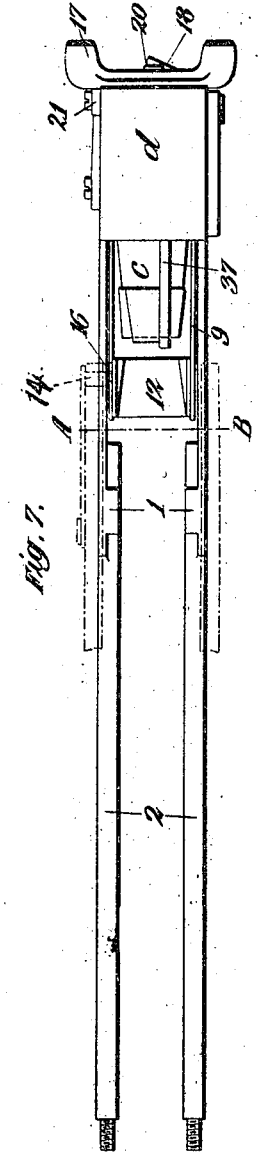
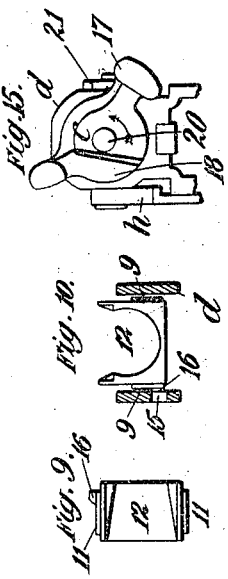
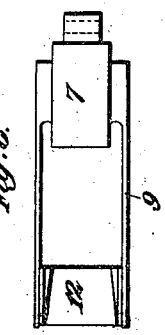

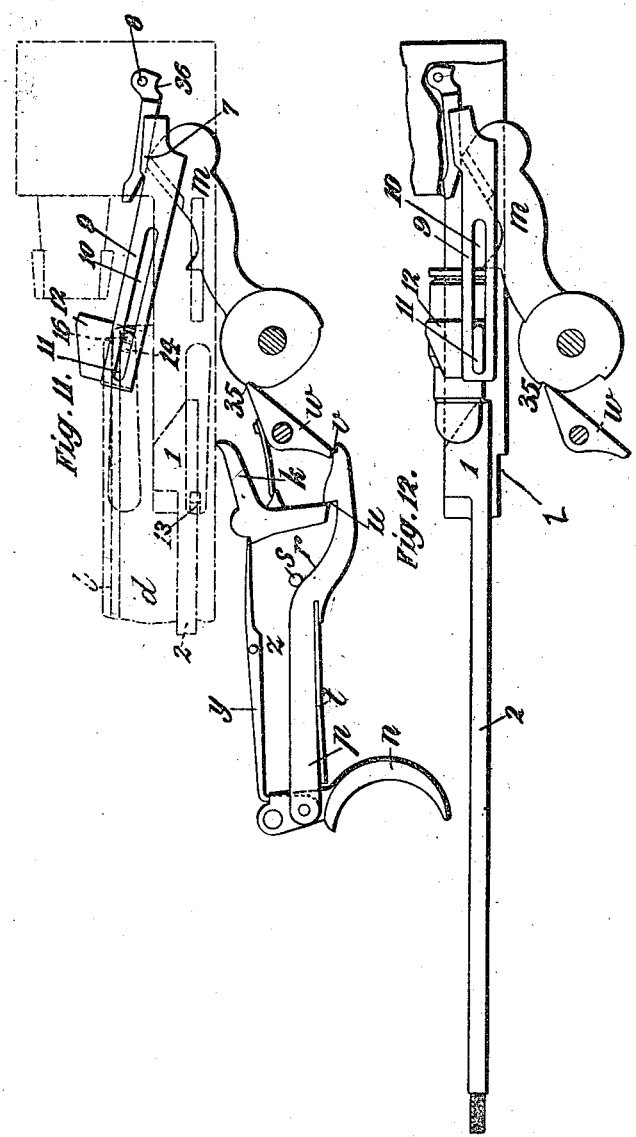

No. 684,055.  
H. W. GABBETT-FAIRFAX.  
AUTOMATIC FIREARM.  
(Application filed Oct. 15, 1900.)  
Patented Oct. 8, 1901.
(No Model.)  
8 Sheets—Sheet 8.
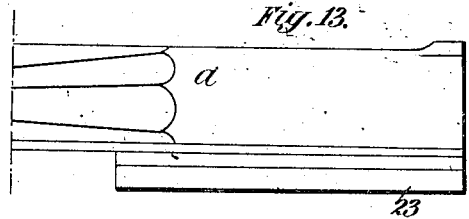
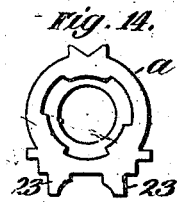
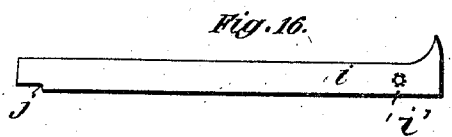
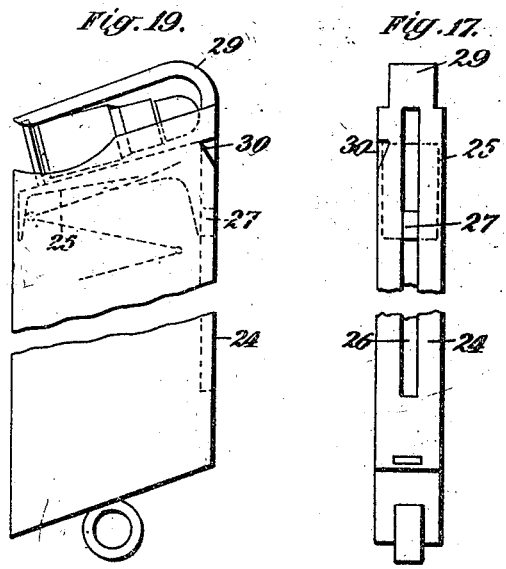
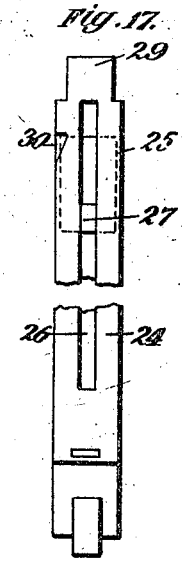

UNITED STATES PATENT OFFICE.

HUGH WILLIAM GABBETT-FAIRFAX, OF LEAMINGTON, ENGLAND.

AUTOMATIC FIREARM.

SPECIFICATION forming part of Letters Patent No. 684,055, dated October 8, 1901.

Application filed October 15, 1900. Serial No. 33,134. (No model.)

*To all whom it may concern:*

Be it known that I, HUGH WILLIAM GABBETT-FAIRFAX, civil engineer, a subject of the Queen of Great Britain, residing at Weston Lodge, Leamington, in the county of Warwick, England, have invented certain new and useful Improvements Relating to the Breech Mechanism of Automatic and other Firearms, of which the following is a specification.

This invention has reference to firearms, and especially to automatic pistols of the kind in which the barrel and breech block or bolt recoil together against the resistance of springs and in which said bolt after becoming unlocked remains held retracted while the barrel advances toward its firing position and opens the breech, the said bolt being subsequently released and permitted to advance under the action of a spring, thereby inserting a fresh cartridge into the barrel and closing the breech.

According to my invention I employ a rotary bolt operated by a spring, as is well understood. I construct the head of the bolt and the portion of the neck immediately behind the same tapered or conical, and I form the breech end of the barrel with a similarly tapered or conical entrance, whereby I obtain a better entry of the cartridge into the barrel than heretofore and at the same time obtain a very effective bearing-surface for locking the bolt to the barrel. A pin or stud on the bolt projects through a circumferential slot on the bolt-sleeve and engages one arm of the crank-lever which is pivoted to the bolt-sleeve and has its other arm adapted to engage a sliding plate carried by the bolt-sleeve. When the trigger is pulled, the hammer is operated in the well-known manner and a detent is raised into the path of the sliding plate and the bolt-sleeve. After the barrel and bolt have recoiled to their full extent this sliding plate is held stationary by the detent, while the bolt-sleeve, bolt, and barrel are moved forward a short distance, the said sliding plate thereby operating the crank-lever so as to unlock the bolt and release the barrel. The bolt-sleeve is then stopped by the detent, and as the barrel continues to move forward the breech is opened. The bolt is held in its unlocked position by a spring-catch, and when the trigger is released the detent is lowered, permitting the breech to close and release the spring-catch, so as to permit the bolt to be locked by its spring. An arm pivoted to the trigger normally depresses the detent and engages the firing-sear. The free end of this arm is inclined and adapted to move rearwardly and downwardly when the trigger is pulled, thereby releasing the detent and operating the firing-sear.

The cartridges are withdrawn from the magazine rearwardly as the barrel and breech-block recoil either by a pair of lugs carried by the bolt-sleeve or by a pair of lugs depending from the barrel. These lugs are so constructed that they withdraw the uppermost cartridge from the magazine and place it upon a lifting device, which when the breech is opened raises the said cartridge into position to be pushed into the barrel by the bolt as the breech is closed.

The cartridge-lifting device comprises a tray which receives the cartridges from the aforesaid lugs and is provided with studs engaging slots in the forked arms of a lifting-lever which is pivoted to the bolt-sleeve and is adapted to lie in the path of the hammer-head when the latter is cocked by the recoil of the breech-block after firing. After being cocked the hammer is capable of a small amount of return movement or "backlash" for the purpose of raising the lifting-lever and tray when the breech is opened. The hammer is also provided with a lug or projection for preventing the tray being carried too far back by the recoil. Suitable spring-stops are provided for holding the tray stationary while the cartridge is placed upon it by the aforesaid lugs and for holding or checking the forward movement of the tray, so as to permit the bolt when it moves forward to close the breech to transfer the cartridge from the tray to the barrel. As the breech is closed the hammer lowers the lifting-lever.

I provide the top of the magazine with an arm which prevents the cartridges being elevated too far. The sides of the magazine, at the upper end thereof, are cut away, so as to permit the aforesaid lugs to engage the topmost cartridge and withdraw it rearwardly.

The cartridge-lifting plate in the magazine is provided with a projection, which when the last cartridge has been withdrawn from the magazine lies in the path of a projection on the trigger, and thus prevents the trigger from being pulled until the empty magazine has been withdrawn or replaced.

To prevent injury by the force of recoil to the springs employed for returning the barrel and bolt-sleeve to their forward position, I provide a separate strong spring arranged to take the pressure of the recoiling barrel, and thus act as a buffer before the limit of compression or strain of the said springs is reached.

Finger-pieces are provided for unlocking the bolt by hand when required. The rear end of the bolt is provided with a cam-shaped projection which prevents the hammer striking the firing-pin except when the bolt is locked. This cam-shaped projection also forces the head of the hammer rearwardly when the bolt is unlocked by hand, thus obviating the necessity of separately cocking the hammer.

In order that my invention may be clearly understood and readily carried into effect, I will proceed to describe the same more fully in connection with the accompanying drawings, which show a pistol constructed according to my invention.

Figure 1 is an elevation of one side of the pistol, showing the cover-plate removed from the lock. Fig. 2 is an elevation of the opposite side of the pistol, showing the breech open. Fig. 3 is a longitudinal sectional view looking at the same side of the pistol as is shown in Fig. 1, the bolt and part of the bolt-sleeve being shown in elevation. Fig. 4 is a longitudinal sectional view showing the barrel, bolt, and bolt-sleeve recoiled. Fig. 5 is a side elevation showing the breech open and the cover-plate of the lock removed. Fig. 6 is a side view, partly in section, and Fig. 7 is a plan, of the bolt-sleeve, bolt, and cartridge-lifting device. Fig. 8 is a plan of the cartridge-lifting device. Fig. 9 is a plan of the cartridge-lifting tray. Fig. 10 is a section on line A B of Fig. 7. Figs. 11 and 12 are detail views of the cartridge-lifting mechanism. Figs. 13 and 14 are respectively a side elevation and an end view showing a modification of the breech and of the barrel. Fig. 15 is a detail view of the breech end of the pistol. Fig. 16 is a detail view showing the sliding plate. Figs. 17, 18, and 19 are respectively a front elevation, a side elevation, and a plan of the cartridge-magazine.

$a$ is the barrel, $b$ the body, $c$ the rotary bolt, and $d$ the bolt-sleeve, of the pistol.

$e$ is a spring which tends to lock the bolt and to hold the pin or stud $f$, carried by the bolt, at the top of a slot $g$ in the bolt-sleeve. The head of the bolt $c$ is tapered, and the part of the neck of the bolt immediately behind the said head is also tapered, the breech end of the barrel being correspondingly tapered, as clearly shown in Fig. 3, so as to facilitate the entry of the cartridge into the barrel and to afford a very effective bearing-surface for locking the bolt to the barrel.

$h$ is the crank-lever, pivoted to the bolt-sleeve and having one arm engaging with the stud $f$ and the other arm engaging with the sliding plate $i$. The sliding plate $i$ is provided with a recess $j$, adapted to engage with a detent $k$ for unlocking the bolt $c$, as hereinafter described.

$l$ is a recess in the under side of the bolt-sleeve $d$ for also engaging with the detent $k$ for opening the breech, as hereinafter described.

The sliding plate $i$ is adapted to slide in a recess $b'$ in the body $b$. A pin $i'$, carried by the plate $i$, engages a groove $i^2$, (see Figs. 3, 4, and 5,) formed in the sleeve $d$, thereby preventing any lateral movement of the said plate $i$ when the sleeve $d$ recoils.

$m$ is the hammer.

$n$ is the trigger, pivoted at $o$ to the body $b$ and having one end of an arm $p$ pivoted to it at $q$. The arm $p$ has an inclined part $r$, which is held in contact with a fixed pin $s$ by a spring $t$, so that when the trigger is pulled the said arm is moved both rearwardly and downwardly. The arm $p$ is provided with shoulders $u$ and $v$. The shoulder $u$ engages the detent $k$, so as to normally hold it out of the path of the bolt-sleeve $d$ and of the sliding plate $i$. The shoulder $v$ operates the firing-sear $w$. This firing-sear is of ordinary well-known construction, being adapted to release the hammer $m$ when the trigger is pulled, and thereby permit the spring $x$ to cause the hammer to strike the firing-pin.

$y$ is a spring which is pivoted at $z$ and tends both to return the trigger to its forward position and also to raise the detent $k$ into the path of the sleeve $d$ and the sliding plate $i$.

1 1 are lugs carried by the bolt-sleeve for withdrawing cartridges from the magazine.

2 2 are rods extending forwardly from the bolt-sleeve $d$. These rods pass through suitable openings in the forward end of the body $b$ and carry the springs 3 3 for returning the bolt-sleeve and bolt to their forward position after recoil, as is well understood. The springs 3 3 bear at one end against the body $b$ and at the other end against nuts on the ends of the rods 1 1.

4 is a spring for returning the barrel to its forward position after recoil. This spring 4 is contained in a recess in the body $b$ and has its ends bearing, respectively, upon the said body and upon a lug 5, depending from the barrel $a$. A short powerful spring 6 is carried by a rod or plunger capable of sliding within a cylinder placed within the spring 4 and carried by the washer, against which the inner end of the spring 4 bears. When the spring 4 has nearly reached the limit of its compression or strain due to the recoil of the barrel, the lug 5 comes into contact with the end of the rod or plunger, the strong spring 6 then acting as a buffer and preventing injury to the spring 4.

7 is a cartridge-lifting lever which is pivoted at 8 to the sleeve $d$ and is provided with arms 9 9, having slots 10 10, in which studs 11 11 on the cartridge-tray 12 are adapted to slide.

13 14 are spring-catches carried by the body $b$. The catch 13 is adapted to pass through the body $b$ and also through a slot 15 in the sleeve $d$ for the purpose of engaging a projection 16 on one of the studs 11, and thus holding the tray 12 stationary while it is receiving a cartridge. The stop 14 also passes through the body $b$ and engages with the projection 16, so as to hold the tray stationary while the cartridge is being removed from the tray 12 by the bolt, as hereinafter described.

The bolt $c$ is provided with a finger-piece 17, whereby it may be unlocked by hand when necessary. The finger-piece 17 carries a cam-shaped projection 18, which lies in the path of the hammer $m$, so as to prevent the said hammer striking the firing-pin except when the bolt is locked. When the bolt is turned, so as to unlock it by hand, the cam-face of the projection 18 bears against a cam-face 19 on one side of the hammer $m$, and thereby moves said hammer rearwardly and obviates the necessity of separately cocking the hammer before the bolt is unlocked. 20 is the firing-pin, of ordinary construction. When the bolt is unlocked, it is retained in its unlocked position so long as the breech is open by a spring-catch 21, pivoted to the sleeve $d$, as clearly shown in Fig. 2. When the breech closes, a shoulder 22 on the body $b$ strikes the lower arm of the catch 21, and thereby turns the said catch about its pivot, so as to release the finger-piece 17 and permit the bolt $c$ to be locked by its spring $e$.

If preferred, the lugs 1 1 may be omitted from the sleeve $d$ and their function performed by lugs 23 23, depending from the barrel, as shown in Figs. 13 and 14.

The stock or handle of the pistol is made hollow to receive the cartridge-magazine 24, which is provided with a cartridge-lifting plate 25, adapted to be raised by a spring, as is well understood. The front of the magazine 24 is provided with a longitudinal slot 26, in which a projection 27, carried by the plate 25, slides. This projection 27 comes into contact with a projection 28 on the trigger when the last cartridge has been withdrawn from the magazine, thereby preventing the pistol being fired until the empty magazine has been withdrawn. The magazine 24 is provided with an arm 29, which prevents the cartridges being elevated too far, while leaving the sides of the said cartridges free to be engaged by the lugs 1 1 on the bolt-sleeve $d$ or by the lugs 23 23 on the barrel. The magazine 24 is also provided with a recess 30, with which a spring-catch 31, pivoted to the body $b$ at 32, engages to retain the magazine in the stock of the pistol. When it is required to remove the magazine, the point of the catch 31 is moved out of the recess 30 by pressing a finger-piece 33, and the magazine is then drawn out of the bottom of the stock.

When the pistol is loaded and the trigger is pulled, the arm $p$ is moved rearwardly and downwardly, thereby permitting the shoulder $u$ to move out of contact with the lower arm of the detent $k$, as shown in Figs. 5 and 11, and also operating the firing-sear, so as to release the hammer and permit it to strike the firing-pin and fire the cartridge. The barrel $a$, bolt $c$, and bolt-sleeve $d$, with the cartridge-lifting device, the sliding plate $i$, and lever $h$, then recoil together into the position shown in Fig. 4, thereby cocking the hammer, a projection 34 on the hammer preventing the tray 12 from recoiling too far. The detent $k$ is also raised by the spring $y$ into engagement with the recess $j$ in the under side of the sliding plate $i$, and thus holds the said plate $i$ stationary while the bolt-sleeve, the bolt, and the barrel are moved forward by the springs 3 and 4 until the detent $k$ also engages with the recess $l$, and thus arrests the forward movement of the sleeve $d$. The plate $i$ thereby causes the lever $h$ to turn about its pivot, so as to unlock the bolt $c$ and release the barrel. The barrel then moves forward into the firing position under the influence of the springs 4, and thereby opens the breech, as shown in Figs. 2 and 5.

When the barrel, the bolt, and the bolt-sleeve recoil, as above described, either the lugs 1 1 on the bolt-sleeve or the lugs 23 23 on the barrel engage with and remove the uppermost cartridge from the magazine rearwardly and place it upon the tray 12. During the first part of the recoil movement the tray 12 is held stationary by the catch 13 for a sufficient length of time to permit the said tray to thus receive the cartridge, the catch 13 passing through the slot 15 in the sleeve $d$ and engaging with the rear side of the projection 16 on the stud 11. As the sleeve $d$ then continues to recoil, the studs 11 reach the forward ends of the slots 10, and the beveled forward end $15^\times$ (shown in Fig. 2) of the slot 15 forces the catch 13 out of engagement with the projection 16, so that the tray 12, with the cartridge in it, is then permitted to move rearwardly into the position shown in Fig. 4.

When the parts of the pistol are in the position shown in Fig. 4, the head of the hammer $m$ bears upon the under side of the part 7 of the lifting-lever. The head of the said hammer has been moved sufficiently far rearwardly to leave a short space between the nose of the firing-sear $w$ and a shoulder 35 on the hammer, as shown clearly in Fig. 12. When the breech is opened, as above described, the head of the hammer moves forward until the shoulder 35 engages the nose of the firing-sear $w$, this forward movement being sufficient to move the lifting-lever about its pivot 8, so as to raise the arms 9 and the tray 12, and thus lift the cartridge into the open breech, as shown in Figs. 2 and 11, the catch 14 then engaging the forward side of the projection 16 on the stud 11. The trigger is then released, whereupon it is moved forward by the spring $y$ and the arm $p$ is moved forwardly and upwardly, so that the shoulder $u$ is caused to lower the detent $k$ out of engagement with the recesses $j$ and $l$ and the recess $v$ engages the sear $w$. When the detent $k$ is thus lowered, the bolt $c$ is kept in its unlocked position by the spring-catch 21. As the springs 3 3 then return the bolt and bolt-sleeve to their forward position the spring-catch 14 momentarily holds the tray 12 stationary while the bolt $c$ moves the cartridge from said tray. The head of the hammer then strikes a recess 36 on the lifting-lever and thereby lowers the arms 9 and the tray 12 the bolt thrusts the cartridge into the barrel, and the breech is closed. When the breech is closed, the shoulder 22 engages with lower arm of the spring-catch 21, and thereby releases the finger-piece 17 and permits the bolt $c$ to be locked in the barrel by its spring $e$, the slot $g$ and stud $f$ then returning the lever $h$ and the sliding plate $i$ to their original positions. The hammer remains cocked, as shown in Fig. 1, and when the trigger is again pulled the cartridge is fired and the breech opened, as above described, the empty cartridge-case being extracted from the barrel by an extractor 37 of well-known construction carried by the bolt $c$, and then struck and ejected by the fresh cartridge, which is raised into the breech by the lifting device, as above described.

In the above-described manner the pistol may be fired and loaded automatically by pulling and releasing the trigger until the last cartridge has been withdrawn from the magazine and inserted in the barrel. The projection 27 on the plate 25 then comes into contact with the nose 28 on the trigger, and thereby prevents this cartridge being fired before the empty magazine has been withdrawn. If this last cartridge is not fired until a full magazine has been placed in the stock of the pistol, the firing may be continued automatically by pulling and releasing the trigger, as above described.

When the pistol is not charged and it is required to begin firing, a full magazine is placed in the stock, and if the lugs on the bolt-sleeve are employed the bolt is unlocked from the barrel by turning the finger-piece by hand in the direction indicated by the arrow in Fig. 15 and then drawing the bolt-sleeve rearwardly by hand, thus cocking the hammer, withdrawing a cartridge from the magazine and placing it on the tray 12, opening the breech, and raising the cartridge, as above described. The bolt-sleeve is then released, whereupon it will be closed by the springs 3, the cartridge being thrust into the barrel and the bolt locked, as above described. By then pulling the trigger the cartridge is fired and the pistol may be operated automatically, as above described. By forming the projection 18 cam-shaped, as shown in Fig. 15, and by forming the inclined or cam surface 19 on the side of the hammer-head the head of the hammer is moved rearwardly when the bolt is unlocked by hand, as above described, and the necessity of first cocking the hammer by hand is thus obviated.

If the lugs 23 are employed instead of the lugs 1, then when it is required to start firing the bolt and barrel are withdrawn to their full extent before unlocking the bolt by hand, and then the breech is permitted to close, as described in the preceding paragraph.

When the bolt is unlocked, the projection 18 lies across the path of the hammer, so that the said hammer cannot strike the firing-pin until the bolt is unlocked. Moreover, should the bolt be by accident only partly locked when the trigger is pulled the cam-face 19 on the hammer will coöperate with the cam-surface of the projection 18 to completely lock the bolt as the hammer moves to strike the firing-pin.

What I claim, and desire to secure by Letters Patent of the United States, is—

1. In an automatic firearm the combination of a barrel, a rotary spring-bolt, a body in which the said barrel and bolt are adapted to recoil after firing, springs for returning the barrel and bolt to their forward position after recoiling, a radial pin carried by the said bolt, a bolt-sleeve having a slot through which the said pin projects, a lever pivoted to the bolt-sleeve and engaging said pin, means for operating said lever so as to unlock the bolt when it is recoiled, means for retaining the unlocked bolt in its recoiled position while permitting the barrel to advance to the firing position, means for holding the bolt unlocked while the breech is open, means for inserting a cartridge in the open breech, means for releasing the bolt and permitting it to close the breech means for locking the bolt when the breech is closed, and means for discharging the firearm, substantially as described for the purpose specified.

2. In an automatic firearm, the combination of a barrel, a rotary spring-bolt, a body in which the said barrel and bolt are adapted to recoil after firing, springs for returning the barrel and bolt to their forward position after recoiling, a sliding plate adapted to recoil with said bolt but capable of free independent longitudinal movement, means for retaining the sliding plate in its extreme recoiled position while permitting the bolt and barrel to move forwardly for a short distance and then arresting the bolt, means operated by the sliding plate for unlocking the bolt from the barrel as they thus move forward so as to permit the barrel to continue to move forward and open the breech, means for holding the bolt unlocked while the breech is open, means for inserting a cartridge in the open breech, means for releasing the bolt and permitting it to close the breech, means for locking the bolt when the breech is closed, and means for discharging the firearm, substantially as described for the purpose specified.

3. In an automatic firearm the combination of a barrel, a rotary spring-bolt, a body in which the said barrel and bolt are adapted to recoil after firing, springs for returning the barrel and bolt to their forward position after recoiling, a sliding plate adapted to recoil with said bolt but capable of free independent longitudinal movement, a detent which engages and retains the sliding plate in its extreme recoiled position and also retains the bolt after the said bolt has moved forward a short distance, means operated by the sliding plate for unlocking the bolt from the barrel as they thus move forward so as to permit the barrel to continue to move forward and open the breech, means for holding the bolt unlocked while the breech is open, means for inserting a cartridge in the open breech, means for disengaging the detent from the sliding plate and from the bolt so as to permit the bolt to close the breech, means for locking the bolt when the breech is closed and means for discharging the firearm, substantially as described for the purpose specified.

4. In an automatic firearm the combination of a barrel, a rotary spring-bolt, a body in which the said barrel and bolt are adapted to recoil after firing, springs for returning the barrel and bolt to their forward position after recoiling, a radial pin carried by the bolt, a bolt-sleeve having a slot through which the said pin projects and also having a recess in its under side, a lever pivoted to the bolt-sleeve and having one arm in engagement with the said pin, a sliding plate which engages the other arm of the lever and is adapted to recoil with the bolt but is capable of independent longitudinal movement, a detent which engages and retains the sliding plate in its extreme recoiled position and also engages with the recess in the under side of the bolt-sleeve when the said sleeve has moved forward a short distance thereby unlocking the bolt and permitting the barrel to move forward and open the breech, means for holding the bolt unlocked while the breech is open, means for inserting a cartridge in the open breech, means for disengaging the detent from the sliding plate and from the bolt-sleeve, means for locking the bolt when the breech is closed and means for discharging the firearm, substantially as described for the purpose specified.

5. In an automatic firearm, the combination of a rotary spring-bolt, a barrel, a body in which said barrel and bolt are adapted to recoil after firing, springs for returning said barrel and bolt to their forward position after recoiling, a radial pin carried by the bolt, a bolt-sleeve having a slot through which the said pin projects and also having a recess in its under side, a lever pivoted to the bolt-sleeve and having one arm in engagement with the said pin, a sliding plate which engages the other arm of the said lever and is adapted to recoil with the bolt but is capable of independent longitudinal movement, a detent which engages and retains the sliding plate in its extreme recoiled position and also engages with the recess in the under side of the bolt-sleeve when the said sleeve has moved forward a short distance after recoil thereby unlocking the bolt and permitting the barrel to move forward and open the breech, means for holding the bolt unlocked while the breech is open, a cartridge-magazine, means for withdrawing cartridges from the magazine, means for raising the cartridges into the breech when opened, means for disengaging the detent from the sliding plate and from the bolt-sleeve and permitting the bolt to close the breech while inserting the raised cartridge into the barrel, means for locking the bolt when the breech is closed and means for discharging the firearm, substantially as described for the purpose specified.

6. In an automatic firearm the combination of a rotary spring-bolt, a barrel, a body in which said barrel and bolt are adapted to recoil after firing, springs for returning said barrel and bolt to their forward position after recoiling, a trigger, an arm pivoted to said trigger and provided with an inclined part and two shoulders, a fixed pin against which the inclined part of the said arm bears, a hammer, a firing-sear operated by one of the shoulders on the arm, a pivoted detent one extremity of which engages the other shoulder on the said arm, a spring which tends to hold the trigger in its forward position and also to raise the detent, means operated by said detent for unlocking the bolt from the barrel when it is recoiled, a bolt-sleeve adapted to be engaged by the detent to permit the barrel to move forward and open the breech, means for holding the bolt unlocked while the breech is open, means for inserting a cartridge in the open breech, a firing-pin, and means for locking the bolt when the breech is closed, substantially as described for the purpose specified.

7. In an automatic firearm the combination of a rotary spring-bolt, a barrel, a body in which the barrel and bolt are adapted to recoil after firing, springs for returning the barrel and bolt to their forward position after recoiling, a trigger, an arm pivoted to said trigger and provided with an inclined part and two shoulders, a fixed pin against which the inclined part of said arm bears, a hammer, a firing-sear operated by one of the shoulders of the arm, a pivoted detent one extremity of which engages the other shoulder of said arm, a spring which tends to hold the trigger in its forward position and also to raise the detent, a sliding plate adapted to recoil with the bolt but capable of independent longitudinal movement and adapted to be engaged by the detent when it has recoiled, a bolt-sleeve also adapted to be engaged by the detent shortly after it has commenced to move forward after recoiling, means operated by the sliding plate for unlocking the bolt when recoiled to permit the barrel to open the breech, means for holding the bolt unlocked when the breech is open, means for inserting a cartridge in the open breech, a firing-pin, and means for locking the bolt when the breech is closed, substantially as described for the purpose specified.

8. In an automatic firearm the combination of a rotary spring-bolt, a barrel, a body in which the barrel and bolt are adapted to recoil after firing, springs for returning the barrel and bolt to their forward position after recoiling, a trigger, an arm pivoted to said trigger and provided with an inclined part and two shoulders, a fixed pin against which the inclined part of said arm bears, a hammer, a firing-sear operated by one of the shoulders of the arm, a pivoted detent one extremity of which engages the other shoulder of said arm, a spring which tends to hold the trigger in its forward position and also to raise the detent, a pin carried by the rotary bolt, a bolt-sleeve provided with a slot through which the said pin projects and also having a recess adapted to engage the detent after the bolt has moved forward a short distance after recoiling so as to permit the barrel to open the breech, a lever carried by the bolt-sleeve and having one of its arms adapted to engage the said pin, a sliding plate which engages the other arm of the lever and is adapted to recoil with the bolt but is capable of independent longitudinal movement and is engaged by the detent when it has recoiled, means for holding the bolt unlocked when the breech is open, means for inserting a cartridge in the open breech, a firing-pin, and means for locking the bolt when the breech is closed, substantially as described for the purpose specified.

9. In an automatic firearm, the combination of a rotary spring-bolt, a barrel, a body in which the barrel and bolt are adapted to recoil after firing, a spring for returning the barrel and bolt to their forward position after recoiling, a trigger, an arm pivoted to said trigger and provided with an inclined part and two shoulders, a fixed pin against which the inclined part of said arm bears, a hammer, a firing-sear operated by one of the shoulders of the arm, a pivoted detent one extremity of which engages the other shoulder of said arm a spring which tends to hold the trigger in its forward position and also to raise the detent, a pin carried by the rotary bolt, a bolt-sleeve provided with a slot through which the said pin projects and also having a recess adapted to engage the detent when the bolt has moved forward a short distance after recoiling so as to permit the barrel to open the breech, a lever carried by the bolt-sleeve and having one of its arms adapted to engage the said pin, a sliding plate which engages the other arm of the lever and is adapted to recoil with the bolt but is capable of independent longitudinal movement and is engaged by the detent when it has recoiled, means for holding the bolt unlocked when the breech is open, a cartridge-magazine, means for withdrawing cartridges from the magazine, means for raising the cartridges into the breech when opened in position to be inserted in the barrel by the bolt as the breech is closed, a firing-pin and means for locking the bolt when the breech is closed, substantially as described for the purpose specified.

10. In an automatic firearm the combination of a rotary spring-bolt, a barrel, a body in which the said barrel and bolt are adapted to recoil, springs for returning the barrel and bolt to their forward position after recoiling, means for unlocking the bolt from the barrel in its recoiled position, a spring-catch carried by the bolt-sleeve, a projection on the bolt adapted to be engaged by said spring-catch when the bolt is unlocked and the breech is open, means for disengaging said spring-catch so as to release the bolt when the breech is closed means for inserting a cartridge in the breech when open, and means for discharging the firearm, substantially as described for the purpose specified.

11. In an automatic firearm the combination of a rotary spring-bolt, a barrel, a body in which the said barrel and bolt are adapted to recoil, springs for returning the barrel and bolt to their forward position after recoiling, means for unlocking the bolt from the barrel in its recoiled position, a spring-catch carried by the bolt-sleeve, a projection on the bolt adapted to be engaged by said spring-catch when the bolt is unlocked and the breech is open, a shoulder on the body which disengages the spring-catch from the bolt when the breech is closed, means for inserting a cartridge in the breech when open, and means for discharging the firearm, substantially as described for the purpose specified.

12. In an automatic firearm the combination of a rotary spring-bolt, a barrel, a body in which the said barrel and bolt are adapted to recoil, springs for returning the barrel and bolt to their forward position after recoiling, means for unlocking the bolt from the barrel in its recoiled position, a spring-catch carried by the bolt-sleeve, a projection on the bolt adapted to be engaged by said spring-catch when the bolt is unlocked and the breech is open, means for retaining the unlocked bolt in its recoiled position while permitting the barrel to advance to its firing position, a cartridge-magazine, means for withdrawing cartridges from the magazine, means for raising the cartridges into the breech when open, means for then releasing the bolt and permitting it to close the breech while inserting the raised cartridge into the barrel, a shoulder on the body which disengages the spring-catch from bolt when the breech is closed, and means for discharging the firearm, substantially as described for the purpose specified.

13. In an automatic firearm the combination of a barrel, a rotary spring-bolt, a body in which the said barrel and bolt are adapted to recoil after firing, springs for returning the barrel and bolt to their forward position after recoiling, a radial pin carried by the said bolt, a bolt-sleeve having a slot through which the said pin projects, a lever pivoted to the bolt-sleeve and engaging said pin, means for operating said lever so as to unlock the bolt when it is recoiled, a spring-catch carried by the bolt-sleeve, a projection on the bolt adapted to be engaged by said spring-catch when the bolt is unlocked and the breech is open, means for retaining the bolt in its recoiled position while permitting the barrel to advance to the firing position, means for inserting a cartridge in the open breach, means for releasing the bolt and permitting it to close the breech, means for disengaging the spring-catch so as to release the bolt when the breech is closed and means for discharging the firearm, substantially as described for the purpose specified.

14. In an automatic firearm, the combination of a barrel, a rotary spring-bolt, a body in which the said barrel and bolt are adapted to recoil after firing, springs for returning the barrel and bolt to their forward position after recoiling, a sliding plate adapted to recoil with said bolt but capable of independent longitudinal movement, means for retaining the sliding plate in its extreme recoiled position while permitting the bolt and barrel to move forwardly for a short distance and then arresting the bolt, means operated by the sliding plate for then unlocking the bolt from the barrel to permit the barrel to move forward and open the breech, a spring-catch carried by the bolt-sleeve, a projection on the bolt adapted to be engaged by said catch when the bolt is unlocked and the breech is open, means for inserting a cartridge in the open breach, means for releasing the bolt and permitting it to close the breech, means for disengaging the spring-catch so as to release the bolt when the breech is closed, and means for discharging the firearm, substantially as described for the purpose specified.

15. In an automatic firearm the combination of a barrel, a rotary spring-bolt, a body in which the said barrel and bolt are adapted to recoil after firing, springs for returning the barrel and bolt to their forward position after recoiling, a radial pin carried by the bolt, a bolt-sleeve having a slot through which the said pin projects and also having a recess in its under side, a lever pivoted to the bolt-sleeve and having one arm in engagement with the said pin, a sliding plate which engages the other arm of the lever and is adapted to recoil with the bolt but is capable of independent longitudinal movement, a detent which engages and retains the sliding plate in its extreme recoiled position and also engages with the recess in the under side of the bolt-sleeve when the said sleeve has moved forward a short distance thereby unlocking the bolt and permitting the barrel to move forward and open the breech, a spring-catch carried by the bolt-sleeve, a projection on the bolt adapted to be engaged by said catch when the bolt is unlocked and the breech is open, means for inserting a cartridge in the open breech, means for disengaging the detent from the bolt-sleeve and from the sliding plate, means for disengaging the spring-catch so as to release the bolt when the breech is closed, and means for discharging the firearm, substantially as described for the purpose specified.

16. In an automatic firearm the combination of a rotary spring-bolt, a barrel, a body in which said barrel and bolt are adapted to recoil after firing, springs for returning said barrel and bolt to their forward position after recoiling, a trigger, an arm pivoted to said trigger and provided with an inclined part and two shoulders, a fixed pin against which the inclined part of the said arm bears, a hammer, a firing-sear operated by one of the shoulders on the arm, a pivoted detent one extremity of which engages the other shoulder on the said arm, a spring which tends to hold the trigger in its forward position and also to raise the detent, means operated by said detent for unlocking the bolt from the barrel when it is recoiled, a bolt-sleeve adapted to be engaged by the detent to permit the barrel to move forward and open the breech, a spring-catch carried by the bolt-sleeve, a projection on the bolt adapted to be engaged by said catch when the bolt is unlocked and the breech is open, means for inserting a cartridge in the open breech, means for disengaging the spring-catch so as to release the bolt when the breech is closed, and a firing-pin, substantially as described for the purpose specified.

17. In an automatic firearm the combination of a rotary spring-bolt, a barrel, a body in which the barrel and bolt are adapted to recoil after firing, springs for returning the barrel and bolt to their forward position after recoiling, a trigger, an arm pivoted to said trigger and provided with an inclined part and two shoulders, a fixed pin against which the inclined part of said arm bears, a hammer, a firing-sear operated by one of the shoulders of the arm, a pivoted detent one extremity of which engages the other shoulder of said arm, a spring which tends to hold the trigger in its forward position and also to raise the detent, a pin carried by the rotary bolt, a bolt-sleeve provided with a slot through which the said pin projects and also having a recess adapted to engage the detent after the bolt has moved forward a short distance after recoiling so as to permit the barrel to open the breech, a lever carried by the bolt-sleeve and having one of its arms adapted to engage the said pin, a sliding plate which engages the other arm of the lever and is adapted to recoil with the bolt but is capable of independent longitudinal movement and is engaged by the detent when it has recoiled, a spring-catch carried by the bolt-sleeve, a projection on the bolt adapted to be engaged by the said catch when the bolt is unlocked and the breech is open, means for inserting a cartridge in the open breech, means for disengaging the spring-catch so as to release the bolt when the breech is closed, and a firing-pin, substantially as described for the purpose specified.

18. In an automatic firearm the combination of a barrel, a bolt, a body in which said barrel and bolt are adapted to recoil, springs for returning the barrel and bolt to their forward position after recoiling, means for unlocking the bolt in its recoiled position while permitting the barrel to advance to the firing position, means for holding the bolt unlocked when the breech is open, a cartridge-magazine, means for withdrawing a cartridge rearwardly from said magazine when the barrel and bolt recoil, means for raising the said cartridge into the breech when open, means for closing the breech, means for locking the bolt when the breech is closed, and means for discharging the firearm, substantially as described for the purpose specified.

19. In an automatic firearm, the combination of a barrel, a bolt, a body in which said barrel and bolt are adapted to recoil, springs for returning the barrel and bolt to their forward position after recoiling, means for unlocking the bolt in its recoiled position, means for retaining the unlocked bolt in its recoiled position while permitting the barrel to advance to the firing position, means for holding the bolt unlocked when the breech is open, a cartridge-magazine, lugs carried by the recoiling part of the firearm for withdrawing a cartridge rearwardly from the magazine when the recoil takes place, means for raising the said cartridge into the breech when open, means for closing the breech and inserting the cartridge in the barrel, means for locking the bolt when the breech is closed, and means for discharging the firearm, substantially as described for the purpose specified.

20. In an automatic firearm the combination of a barrel, a rotary spring-bolt, a body in which the said barrel and bolt are adapted to recoil after firing, springs for returning the barrel and bolt to their forward position after recoiling, a radial pin carried by the said bolt, a bolt-sleeve having a slot through which the said pin projects, a lever pivoted to the bolt-sleeve and engaging said pin, means for operating said lever so as to unlock the bolt when it is recoiled, means for retaining the unlocked bolt in its recoiled position while permitting the barrel to advance to the firing position, means for holding the bolt unlocked while the breech is open, a cartridge-magazine, lugs carried by the recoiling part of the firearm for withdrawing a cartridge rearwardly from the magazine when the recoil takes place, means for raising the said cartridge into the breech when open, means for closing the breech and inserting the cartridge in the barrel, means for locking the bolt when the breech is closed, and means for discharging the firearm, substantially as described for the purpose specified.

21. In an automatic firearm, the combination of a barrel, a rotary spring-bolt, a body in which the said barrel and bolt are adapted to recoil after firing, springs for returning the barrel and bolt to their normal position after recoiling, a sliding plate adapted to recoil with said bolt but capable of independent longitudinal movement, means for retaining the sliding plate in its extreme recoiled position while permitting the bolt and barrel to move forwardly for a short distance and then arresting the bolt, means operated by the sliding plate for then unlocking the bolt from the barrel to permit the barrel to move forward and open the breech, a cartridge-magazine, lugs carried by the recoiling part of the firearm for withdrawing a cartridge rearwardly from the magazine when the recoil takes place, means for raising the said cartridge into the breech when open, means for closing the breech and inserting the cartridge in the barrel, means for locking the bolt when the breech is closed, and means for discharging the firearm, substantially as described for the purpose specified.

22. In an automatic firearm the combination of a barrel, a rotary spring-bolt, a body in which the said barrel and bolt are adapted to recoil after firing, springs for returning the barrel and bolt to their forward position after recoiling, a radial pin carried by the bolt, a bolt-sleeve having a slot through which the said pin projects and also having a recess in its under side, a lever pivoted to the bolt-sleeve and having one arm in engagement with the said pin, a sliding plate which engages the other arm of the lever and is adapted to recoil with the bolt but is capable of independent longitudinal movement, a detent which engages and retains the sliding plate in its extreme recoiled position and also engages with the recess in the under side of the bolt-sleeve when the said sleeve has moved forward a short distance thereby unlocking the bolt and permitting the barrel to move forward and open the breech, means for holding the bolt unlocked while the breech is open, a cartridge-magazine, lugs carried by the recoiling part of the firearm for withdrawing a cartridge rearwardly from the magazine when the recoil takes place, means for raising the said cartridge into the breech when open, means for disengaging the detent from the sliding plate and from the bolt-sleeve so as to permit the bolt to close the breech and insert the cartridge in the barrel, means for locking the bolt when the breech is closed, and means for discharging the firearm, substantially as described for the purpose specified.

23. In an automatic firearm, the combination of a rotary spring-bolt, a barrel, a body in which said barrel and bolt are adapted to recoil after firing, springs for returning said barrel and bolt to their forward position after recoiling, a trigger, an arm pivoted to said trigger and provided with an inclined part and two shoulders, a fixed pin against which the inclined part of the said arm bears, a hammer, a firing-sear operated by one of the shoulders on the arm, a pivoted detent one extremity of which engages the other shoulder on the said arm, a spring which tends to hold the trigger in its forward position and also to raise the detent, means operated by said detent for unlocking the bolt from the barrel when it is recoiled, a bolt-sleeve adapted to be engaged by the detent to permit the barrel to move forward and open the breech, means for holding the bolt unlocked while the breech is open, a cartridge-magazine, lugs carried by the recoiling part of the firearm for withdrawing a cartridge rearwardly from the magazine when the recoil takes place, means for raising the cartridge into the breech when open, a firing-pin, and means for locking the breech when closed, substantially as described for the purpose specified.

24. In an automatic firearm the combination of a rotary spring-bolt, a barrel, a body in which the barrel and bolt are adapted to recoil after firing, springs for returning the barrel and bolt to their forward position after recoiling, a trigger, an arm pivoted to said trigger and provided with an inclined part and two shoulders, a fixed pin against which the inclined part of said arm bears, a hammer, a firing-sear operated by one of the shoulders of the arm, a pivoted detent one extremity of which engages the other shoulder of said arm, a spring which tends to hold the trigger in its forward position and also to raise the detent, a pin carried by the rotary bolt, a bolt-sleeve provided with a slot through which the said pin projects and also having a recess adapted to engage the detent after the bolt has moved forward a short distance after recoiling so as to permit the barrel to open the breech, a lever carried by the bolt-sleeve and having one of its arms adapted to engage the said pin, a sliding plate which engages the other arm of the lever and is adapted to recoil with the bolt but is capable of independent longitudinal movement and is engaged by the detent when it has recoiled, means for holding the bolt unlocked when the breech is open, a cartridge-magazine, lugs carried by the recoiling part of the firearm for withdrawing a cartridge rearwardly from the magazine when the recoil takes place, means for raising the cartridge into the breech when open, a firing-pin, and means for locking the breech when closed, substantially as described for the purpose specified.

25. In an automatic firearm the combination of a rotary spring-bolt, a barrel, a body in which the said barrel and bolt are adapted to recoil, springs for returning the body and bolt to their forward position after recoiling, means for unlocking the bolt from the barrel in its recoiled position, a spring-catch carried by the bolt-sleeve, a projection on the bolt adapted to be engaged by said spring-catch when the bolt is unlocked and the breech is open, means for disengaging said spring-catch so as to release the bolt when the breech is closed, a cartridge-magazine, lugs carried by the recoiling part of the firearm for withdrawing a cartridge rearwardly from the magazine when the recoil takes place, means for raising the cartridge into the breech when open and means for discharging the firearm, substantially as described for the purpose specified.

26. In an automatic firearm the combination of a rotary spring-bolt, a barrel, a body in which the barrel and bolt are adapted to recoil after firing, springs for returning the barrel and bolt to their forward position after recoiling, a trigger, an arm pivoted to said trigger and provided with an inclined part and two shoulders, a fixed pin against which the inclined part of the said arm bears, a hammer, a firing-sear operated by one of the shoulders of the arm, a pivoted detent one extremity of which engages the other shoulder of said arm, a spring which tends to hold the trigger in its forward position and also to raise the detent, a pin carried by the rotary bolt, a bolt-sleeve provided with a slot through which the said pin projects and also having a recess adapted to engage the detent after the bolt has moved forward a short distance after recoiling so as to permit the barrel to open the breech, a lever carried by the bolt-sleeve and having one of its arms adapted to engage the said pin, a sliding plate which engages the other arm of the lever and is adapted to recoil with the bolt but is capable of independent longitudinal movement and is engaged by the detent when it has recoiled, a spring-catch carried by the bolt-sleeve, a projection on the bolt adapted to be engaged by the said catch when the bolt is unlocked and the breech is open, a cartridge-magazine, lugs carried by the recoiling part of the firearm for withdrawing a cartridge rearwardly from the magazine when the recoil takes place, means for raising the cartridge into the breech when open, means for discharging the spring-catch so as to release the bolt when the breech is closed, and a firing-pin, substantially as described for the purpose specified.

27. In an automatic firearm the combination of a barrel, a bolt, a body in which the said barrel and bolt are adapted to recoil, springs for returning the barrel and bolt to their forward position after recoiling, means for unlocking the bolt in its recoiled position, means for retaining the bolt in its recoiled position while permitting the barrel to advance to the firing position, means for holding the bolt unlocked when the breech is open, a cartridge-magazine, means for withdrawing a cartridge from said magazine when the barrel and breech recoil, a tray for receiving said cartridge, a lever having arms in which said tray is adapted to slide, means for raising the arms and the tray when the breech is open, means for transferring the cartridge from the tray to the barrel, means for closing the breech, means for lowering the tray and slotted arms as the breech is closed, means for locking the bolt when the breech is closed, and means for discharging the firearm, substantially as described for the purpose specified.

28. In an automatic firearm the combination of a barrel, a bolt, a body in which the said barrel and bolt are adapted to recoil, springs for returning the barrel and bolt to their forward position after recoiling, means for unlocking the bolt in its recoiled position, means for retaining the bolt in its recoiled position while permitting the barrel to advance to the firing position, means for holding the bolt unlocked when the breech is open, a cartridge-magazine, means for withdrawing a cartridge rearwardly from said magazine when the barrel and breech recoil, a tray for receiving said cartridge, a lever having arms in which said tray is adapted to slide, means for raising the said arms and the tray when the breech is open, means for transferring the cartridge from the tray to the barrel, means for closing the breech, means for preventing the tray sliding in the said arms when it receives the cartridge, means for preventing the tray sliding in the said arms when the cartridge is removed from it, means for lowering the tray and the arms as the breech is closed, means for locking the bolt when the breech is closed, and means for discharging the firearm, substantially as described for the purpose specified.

29. In an automatic firearm the combination of a barrel, a bolt, a body in which the said barrel and bolt are adapted to recoil, springs for returning the barrel and bolt to their forward position after recoiling, means for unlocking the bolt in its recoiled position, means for retaining the bolt in its recoiled position while permitting the barrel to advance to the firing position, means for holding the bolt unlocked when the breech is open, a cartridge-magazine, lugs carried by the recoiling part of the firearm for withdrawing a cartridge rearwardly from said magazine when recoil takes place, a tray for receiving said cartridge, a lever having arms in which said tray is adapted to slide, means for raising the said arms and the tray when the breech is open, means for transferring the cartridge from the tray to the barrel, means for closing the breech, a spring-catch for preventing the tray sliding in the said arms when it receives the cartridge, another spring-catch for preventing the tray moving in said arms when the cartridge is removed from it, means for lowering the tray and the arms as the breech is closed, means for locking the bolt when the breech is closed, and means for discharging the firearm, substantially as described for the purpose specified.

30. In an automatic firearm the combination of a barrel, a bolt, a body in which the said barrel and bolt are adapted to recoil, springs for returning the barrel and bolt to their forward position after recoiling, means for unlocking the bolt in its recoiled position, means for retaining the bolt in its recoiled position while permitting the barrel to advance to the firing position, means for holding the bolt unlocked when the breech is open, a cartridge-magazine, means for withdrawing a cartridge rearwardly from the magazine as the barrel and bolt recoil, a tray for receiving said cartridge, a lever pivoted to the bolt-sleeve and having arms in which said tray is adapted to slide, a hammer capable of slight movement or backlash when cocked and adapted to bear on the under side of said lever when the barrel and bolt recoil, means for transferring the cartridge from the tray to the barrel, means for closing the breech, means for locking the bolt when the breech is closed, and means for discharging the firearm, substantially as described for the purpose specified.

31. In an automatic firearm the combination of a barrel, a bolt, a body in which the said barrel and bolt are adapted to recoil, springs for returning the barrel and bolt to their forward position after recoiling, means for unlocking the bolt in its recoiled position, means for retaining the bolt in its recoiled position while permitting the barrel to advance to the firing position, means for holding the bolt unlocked when the breech is open, a cartridge-magazine, lugs carried by the recoiling part of the firearm for withdrawing a cartridge rearwardly from the magazine when the recoil takes place, a tray for receiving said cartridge, a lever pivoted to the bolt-sleeve and having arms in which said tray is adapted to slide, a hammer capable of a slight movement or backlash when cocked and adapted to bear on the under side of the said lever when the barrel and bolt recoil, a spring-catch to prevent the tray sliding in the said arms when the cartridge is removed from it, means permitting the breech to close as the bolt transfers the cartridge from the tray to the barrel, means for locking the bolt as the breech is closed, and means for discharging the firearm, substantially as described for the purpose specified.

32. In an automatic firearm the combination of a barrel, a rotary spring-bolt, a body in which the said barrel and bolt are adapted to recoil after firing, springs for returning the barrel and bolt to their forward position after recoiling, a radial pin carried by the bolt, a bolt-sleeve having a slot through which the said pin projects and also having a recess in its under side, a lever pivoted to the bolt-sleeve and having one arm in engagement with the said pin, a sliding plate which engages the other arm of the lever and is adapted to recoil with the bolt but is capable of independent longitudinal movement, a detent which engages and retains the sliding plate in its extreme recoiled position and also engages with the recess in the under side of the bolt-sleeve when the said sleeve has moved forward a short distance thereby unlocking the bolt and permitting the barrel to move forward and open the breech, means for holding the bolt unlocked while the breech is open, a cartridge-magazine, lugs carried by the recoiling part of the firearm for withdrawing a cartridge rearwardly from the magazine when the recoil takes place, a tray for receiving said cartridge, a lifting-lever pivoted to the bolt-sleeve and having arms in which said tray is adapted to slide, a hammer capable of a slight movement or backlash when cocked and adapted to bear on the under side of the lifting-lever when the barrel and bolt recoil, a spring-catch to prevent the tray sliding in the said arms when it receives the cartridge, another spring-catch for preventing the tray sliding in said arms when the cartridge is removed from it, means for disengaging the detent from the sliding plate and from the bolt-sleeve, means for locking the bolt when the breech is closed, and means for discharging the firearm, substantially as described for the purpose specified.

33. In an automatic firearm the combination of a rotary spring-bolt, a barrel, a body in which said barrel and bolt are adapted to recoil after firing, springs for returning said barrel and bolt to their forward position after recoiling, a trigger, an arm pivoted to said trigger and provided with an inclined part and two shoulders, a fixed pin against which the inclined part of said arm bears, a firing-sear operated by one of the shoulders of the arm, a pivoted detent one extremity of which engages the other shoulder on the said arm, a spring which tends to hold the trigger in its forward position and also to raise the detent, means operated by said detent for unlocking the bolt from the barrel when it is recoiled, a bolt-sleeve adapted to be engaged by said detent to permit the barrel to move forward and open the breech, means for holding the bolt unlocked while the breech is open, a cartridge-magazine, lugs carried by the recoiling part of the firearm for withdrawing a cartridge rearwardly from the magazine when the recoil takes place, a tray for receiving said cartridge, a lifting-lever pivoted to the bolt-sleeve and having arms in which said tray is adapted to slide, a hammer capable of a slight movement or backlash when cocked and adapted to bear on the under side of the lifting-lever when the barrel and bolt recoil, a spring-catch to prevent the tray sliding in the said arms when it receives the cartridge, another spring-catch for preventing the tray sliding on said arms when the cartridge is removed from it, a firing-pin, and means for locking the bolt when the breech is closed, substantially as described for the purpose specified.

34. In an automatic firearm the combination of a rotary spring-bolt, a barrel, a body in which said barrel and bolt are adapted to recoil after firing, springs for returning said barrel and bolt to their forward position after recoiling, a trigger, an arm pivoted to said trigger and provided with an inclined part and two shoulders, a fixed pin against which the inclined part of said arm bears, a firing-sear operated by one of the shoulders of the arm, a pivoted detent one extremity of which engages the other shoulder on the said arm, a spring which tends to hold the trigger in its forward position and also to raise the detent, a pin carried by the rotary bolt, a bolt-sleeve provided with a slot through which the said pin projects and also having a recess adapted to engage the detent after the bolt has moved forward a short distance after recoiling so as to permit the barrel to open the breech, a lever carried by the bolt-sleeve and having one of its arms adapted to engage the said pin, a sliding plate which engages the other arm of the lever and is adapted to recoil with the bolt but is capable of independent longitudinal movement and is engaged by the detent when it has recoiled, means for holding the bolt unlocked when the breech is open, a cartridge-magazine, lugs carried by the recoiling part of the firearm for withdrawing a cartridge rearwardly from the magazine when the recoil takes place, a tray for receiving said cartridge, a lifting-lever pivoted to the bolt-sleeve and having arms in which said tray is adapted to slide, a hammer capable of a slight movement or backlash when cocked and adapted to bear on the under side of the lifting-lever when the barrel and bolt recoil, a spring-catch to prevent the tray sliding in the said arms when it receives the cartridge, another spring-catch for preventing the tray sliding on said arms when the cartridge is removed from it, a firing-pin, and means for locking the bolt when the breech is closed, substantially as described for the purpose specified.

35. In an automatic firearm the combination of a rotary spring-bolt, a barrel, a body in which the said barrel and bolt are adapted to recoil, springs for returning the body and bolt to their forward position after recoiling, means for unlocking the bolt from the barrel in its recoiled position, a spring-catch carried by the bolt-sleeve, a projection on the bolt adapted to be engaged by said spring-catch when the bolt is unlocked and the breech is open, means for disengaging said spring-catch so as to release the bolt when the breech is closed, means for retaining the bolt in its recoiled position while permitting the barrel to advance to open the breech, a cartridge-magazine, lugs carried by the recoiling part of the firearm for withdrawing a cartridge rearwardly from the magazine when the recoil takes place, a tray for receiving said cartridge, a lifting-lever pivoted to the bolt-sleeve and having arms in which said tray is adapted to slide, a hammer capable of a slight movement or backlash when cocked and adapted to bear on the under side of the lifting-lever when the barrel and bolt recoil, a spring-catch to prevent the tray sliding in the said arms when it receives the cartridge, another spring-catch for preventing the tray sliding on said arms when the cartridge is removed from it, means for closing the breech and means for discharging the firearm substantially as described for the purpose specified.

36. In an automatic firearm the combination of a rotary spring-bolt, a barrel, a body in which said barrel and bolt are adapted to recoil after firing, springs for returning said barrel and bolt to their forward position after recoiling, a trigger, an arm pivoted to said trigger and provided with an inclined part and two shoulders, a fixed pin against which the inclined part of said arm bears, a firing-sear operated by one of the shoulders of the arm, a pivoted detent one extremity of which engages the other shoulder on the said arm, a spring which tends to hold the trigger in its forward position and also to raise the detent, a pin carried by the rotary bolt, a bolt-sleeve provided with a slot through which the said pin projects and also having a recess adapted to engage the detent after the bolt has moved forward a short distance after recoiling so as to permit the barrel to open the breech, a lever carried by the bolt-sleeve and having one of its arms adapted to engage the said pin, a sliding plate which engages the other arm of the lever and is adapted to recoil with the bolt but is capable of independent longitudinal movement and is engaged by the detent when it has recoiled, a spring-catch carried by the bolt-sleeve, a projection on the bolt adapted to be engaged by the said spring-catch when the bolt is unlocked and the breech is open, means for disengaging said spring-catch so as to release the bolt when the breech is closed, a cartridge-magazine, lugs carried by the recoiling part of the firearm for withdrawing a cartridge rearwardly from the magazine when the recoil takes place, a tray for receiving said cartridge, a lifting-lever pivoted to the bolt-sleeve and having arms in which said tray is adapted to slide, a hammer capable of a slight movement or backlash when cocked and adapted to bear on the under side of the lifting-lever when the barrel and bolt recoil, a spring-catch to prevent the tray sliding in the said arms when it receives the cartridge, another spring-catch for preventing the tray sliding on said arms when the cartridge is removed from it, and a firing-pin, substantially as described for the purpose specified.

37. In an automatic firearm the combination of a barrel, a bolt, a body in which said barrel and bolt are adapted to recoil after firing, springs for returning the barrel and bolt to their forward position after recoiling, a cartridge-magazine, means for elevating the cartridges in the magazine, an arm carried by said magazine which arm prevents the top cartridge in the magazine being elevated too far while exposing the sides of the cartridge, means carried by the recoiling parts of the firearm for engaging and withdrawing the topmost cartridge from the magazine, means for unlocking the bolt from the barrel in the recoiled position, means for retaining the unlocked bolt in its recoiled position while permitting the barrel to advance to the firing position, means for holding the bolt unlocked when the breech is open, means for raising the cartridge into the open breech, means for closing the breech, means for locking the bolt when the breech is closed, and means for discharging the firearm, substantially as described for the purpose specified.

38. In an automatic firearm the combination of a barrel, a bolt, a body in which said barrel and bolt are adapted to recoil after firing, springs for returning the barrel and bolt to their forward position after recoiling, a cartridge-magazine, means for elevating the cartridges in the magazine, an arm carried by said magazine which arm prevents the top cartridge in the magazine being elevated too far while exposing the sides of the cartridge, lugs carried by the recoiling part of the firearm for engaging and withdrawing the topmost cartridge rearwardly from the magazine, a tray to receive the said cartridge, means for unlocking the bolt from the barrel in the recoiled position, means for retaining the bolt in its recoiled position while permitting the barrel to advance to its firing position, means for holding the bolt unlocked when the breech is open, means for raising the tray and cartridge into the open breech, means for releasing the bolt and permitting it to close the breech while transferring the cartridge from the tray to the barrel, means for lowering the tray as the breech is closed, means for locking the bolt when the breech is closed and means for discharging the firearm, substantially as described for the purpose specified.

39. In an automatic firearm the combination of a barrel, a bolt, a body in which said barrel and bolt are adapted to recoil after firing, springs for returning the barrel and bolt to their forward position after recoiling, a hammer, a firing-pin carried by the bolt and adapted to be struck by the hammer, a trigger, a projection carried by the trigger, a cartridge-magazine having a longitudinal slot, a cartridge-elevating spring-plate having a projection adapted to move in a slot in the magazine and engage the projection carried by the trigger when the magazine is empty, means for withdrawing a cartridge from the magazine when the barrel and bolt recoil, means for unlocking the bolt in its recoiled position, means for retaining the unlocked bolt in its recoiled position while permitting the barrel to advance to the firing position, means for holding the bolt unlocked when the breech is open, means for inserting the cartridge in the open breech, means for locking the bolt when the breech is closed, and means operated by the trigger to cause the hammer to strike the firing-pin, substantially as described for the purpose specified.

40. In an automatic firearm the combination of a barrel, a rotary spring-bolt, a body in which the barrel and bolt are adapted to recoil after firing, springs for returning the barrel and bolt to their forward position after recoiling, means for unlocking the bolt from the barrel when recoiled, means for retaining the unlocked bolt in its recoiled position while permitting the barrel to advance to the firing position, means for holding the bolt unlocked when the breech is open, means for inserting a cartridge in the open breech, means for releasing the bolt and permitting it to close the breech, means for locking the bolt when the breech is closed, a firing-pin carried by the bolt, a rearward extension carried by the bolt which extension has a beveled face and is adapted to prevent the hammer striking the pin except when the bolt is locked, a hammer, a trigger, and means operated by the trigger for causing the hammer to strike the firing-pin, substantially as described for the purpose specified.

41. In an automatic firearm the combination of a barrel, a rotary spring-bolt, a body in which the barrel and bolt are adapted to recoil after firing, springs for returning the barrel and bolt to their forward position after recoiling, means for unlocking the bolt from the barrel when recoiled, means for retaining the unlocked bolt in its recoiled position while permitting the barrel to advance to the firing position, means for holding the bolt unlocked when the breech is open, means for inserting a cartridge in the open breech, means for releasing the bolt and permitting it to close the breech, means for locking the bolt when the breech is closed, a firing-pin carried by the bolt a rearward extension carried by the bolt which extension has a beveled face and is adapted to prevent the hammer striking the pin except when the bolt is locked, a hammer having a beveled edge adapted to coöperate with said beveled extension, a trigger, and means operated by said trigger for causing the hammer to strike the firing-pin, substantially as described for the purpose specified.

42. In an automatic firearm a barrel, a bolt, a body in which the barrel and bolt are adapted to recoil, springs for returning the barrel and bolt to their forward position after firing, a strong spring situated within the spring for returning the barrel to its position and adapted to act as a buffer, means for unlocking the bolt from the barrel in its recoiled position, means for retaining the unlocked bolt in its recoiled position while permitting the barrel to advance to the firing position, means for holding the bolt unlocked when the breech is open, means for inserting a cartridge in the open breech, means for releasing the bolt and permitting it to close the breech, means for locking the bolt when the breech is closed, and means for discharging the firearm, substantially as described for the purpose specified.

In testimony whereof I have hereunto set my hand, in presence of two subscribing witnesses, this 4th day of October, 1900.

HUGH WILLIAM GABBETT-FAIRFAX.

Witnesses:
THOMAS SELBY WARDL,
WALTER J. SKERTEN.